May 16, 1933.  W. LA HODNY  1,908,768
COMBINED REAR VIEW MIRROR AND CLOCK SUPPORTING BRACKET
Filed Dec. 11, 1930  3 Sheets-Sheet 1

Inventor
William La Hodny
By Popp & Powers
Attorneys

May 16, 1933.  W. LA HODNY  1,908,768
COMBINED REAR VIEW MIRROR AND CLOCK SUPPORTING BRACKET
Filed Dec. 11, 1930   3 Sheets-Sheet 2
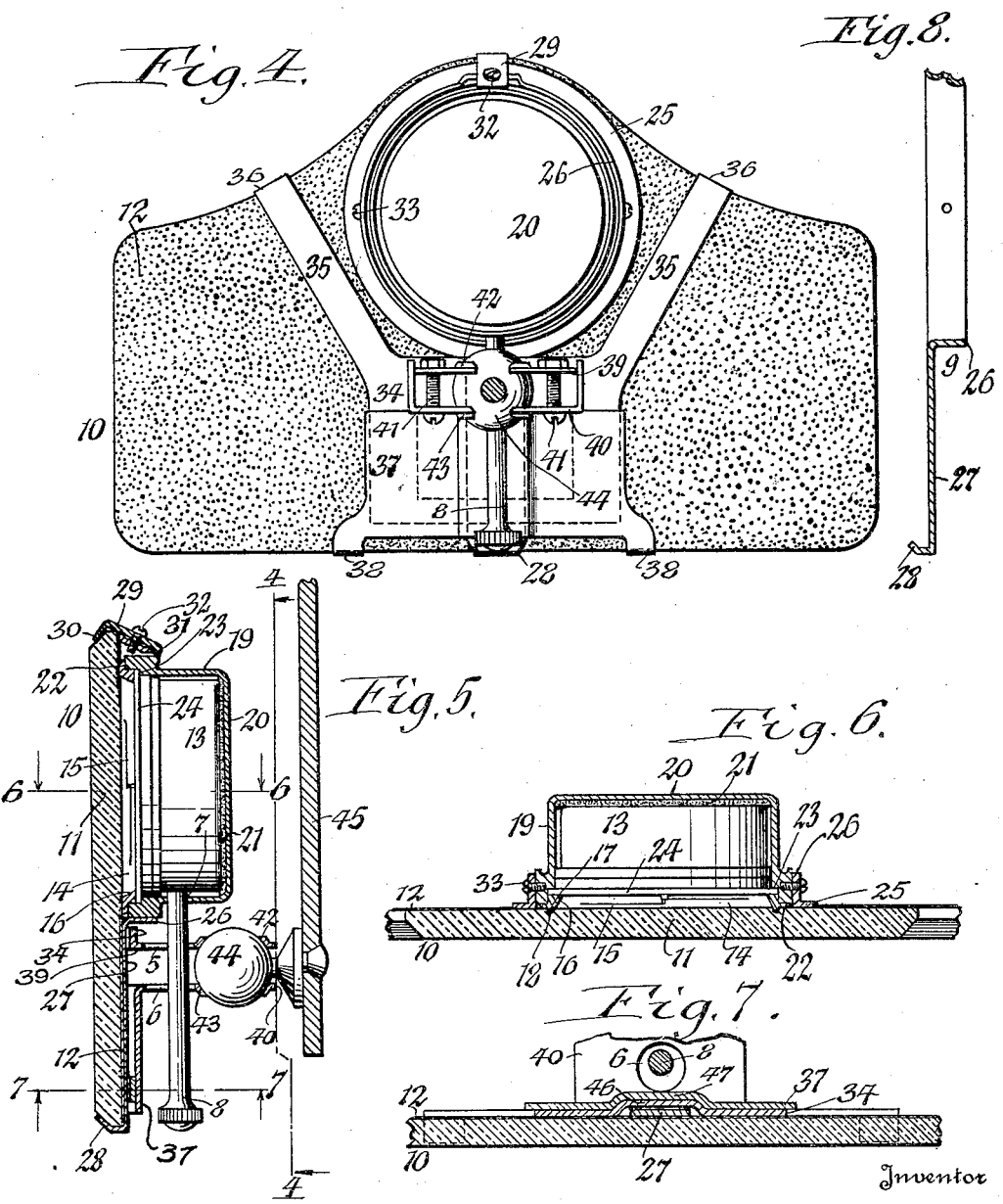
Inventor
William La Hodny
By Popp & Powers
Attorneys May 16, 1933.  W. LA HODNY  1,908,768
COMBINED REAR VIEW MIRROR AND CLOCK SUPPORTING BRACKET
Filed Dec. 11, 1930  3 Sheets-Sheet 3
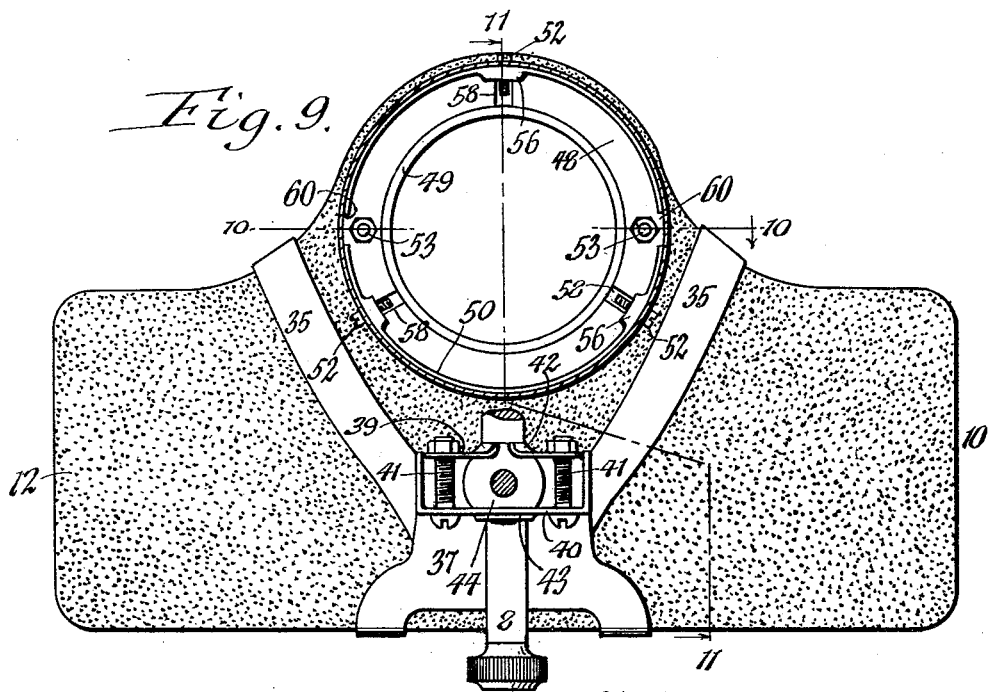
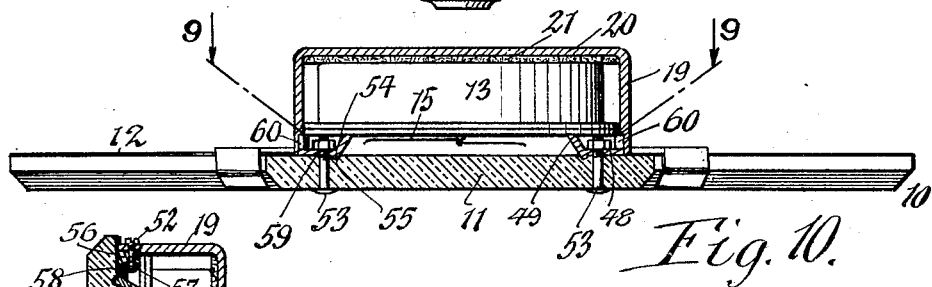
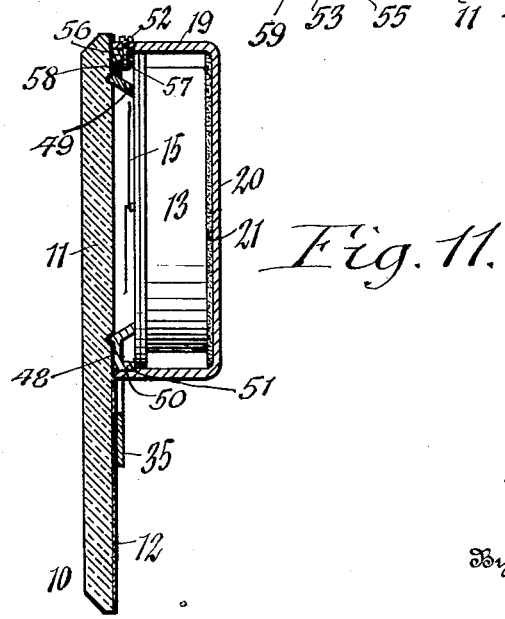
Inventor
William La Hodny
By Popp & Powers
Attorneys Patented May 16, 1933

1,908,768

UNITED STATES PATENT OFFICE

WILLIAM LA HODNY, OF BUFFALO, NEW YORK

COMBINED REAR VIEW MIRROR AND CLOCK SUPPORTING BRACKET

Application filed December 11, 1930. Serial No. 501,527.

This invention relates to a combined rear view mirror and clock supporting bracket and has for its object the production of a bracket of this character whereby the mirror and clock are supported in a symmetrical position relatively to each other but in which the mounting of the mirror and the mounting of the clock are not physically connected with each other except through the mirror, thereby permitting of constructing the clock and its mounting and the mirror and its mounting as separate units and then assembling the same as a whole and still enable each of these units to be assembled and disassembled for inspection, adjustment or repairs independently of the other unit.

In the accompanying drawings:—

Fig. 4 is a rear elevation of the same, partly in section, taken on line 4—4, Fig. 5.

Fig. 5 is a vertical transverse section taken on line 5—5, Fig. 1.

Figs. 6 and 7 are horizontal sections taken on the correspondingly numbered lines in Fig. 5.

Fig. 8 is a detached vertical section of the upright plates forming part of the means for detachably mounting the clock on the rear side of the mirror plate.

Fig. 9 is a rear elevation of a rear vision mirror and clock bracket, partly in section, taken on line 9—9, Fig. 10 and showing a modified construction of my invention.

Fig. 10 is a horizontal section taken on line 10—10, Fig. 9.

Fig. 11 is a vertical section taken on line 11—11, Fig. 9.

In the following description similar characters of reference indicate like parts in the several figures of the drawings.

Figure 1:
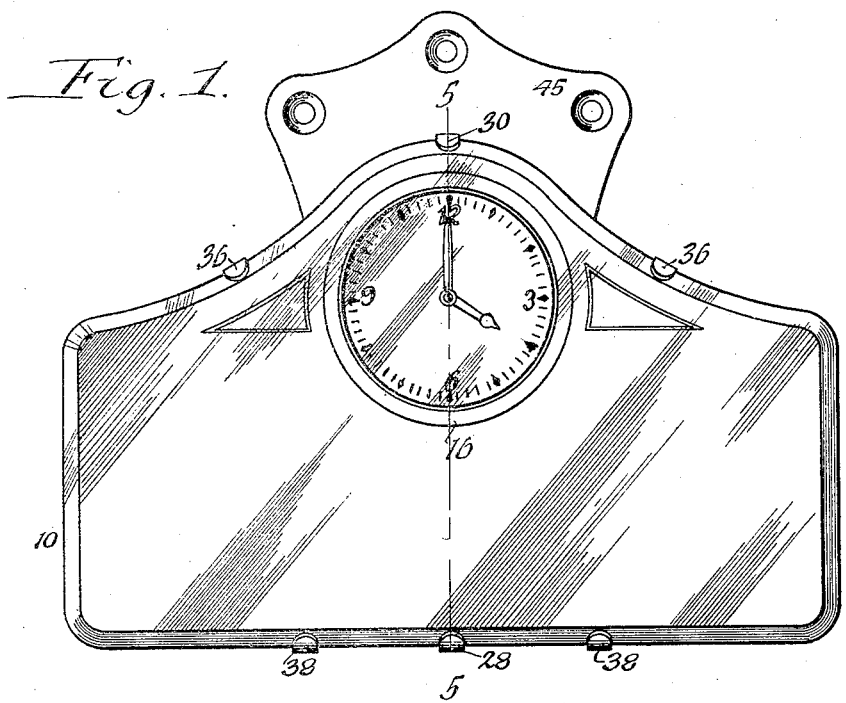
Fig. 1 is a front elevation of a combination mirror and clock supporting bracket embodying one form of my invention.

The numeral 10 represents a mirror which may be of various forms but in the present case the lower part of this mirror is substantially of rectangular form while the upper part thereof extends upwardly in rounded form from the rectangular lower part thereof in the form of a rounded extension. The upwardly extending part of the mirror is uncoated on its rear side so as to form a transparent or clear area 11, as shown in Fig. 5 but the rectangular or lower part of the mirror plate is provided on its rear side with a reflecting coating 12 so as to convert this part of the glass plate into a mirror. That part of the rear side of the mirror plate immediately around the transparent area may be treated in any suitable way by decorating the same or by also coating the same with a reflecting coating.

In rear of the transparent area of the mirror plate is arranged a clock or other time piece which has the front side of its casing 13 spaced a sufficient distance from the rear side of the transparent plate so as to form a chamber 14 in which the hands 15 of the clock are free to rotate. This spacing of the clock casing from the rear side of the mirror plate is preferably effected by interposing a bezel 16 of annular or ring form between the marginal part of the front side of the clock case 13 and the rear side of the mirror plate. The front side of this bezel may be perfectly plain and engage with the flat rear side of the mirror plate, as shown in Fig. 5 or this bezel may be provided on its front side with an annular rib 17 which engages with an annular groove 18 on the rear side of the mirror plate, as shown in Fig. 6.

Figure 2:
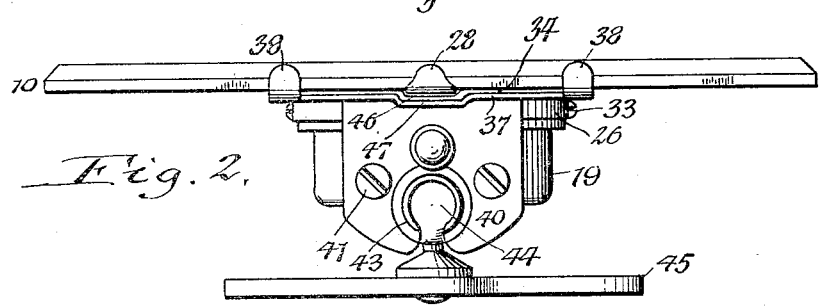
Fig. 2 is a bottom plan view of the same.
Figure 3:
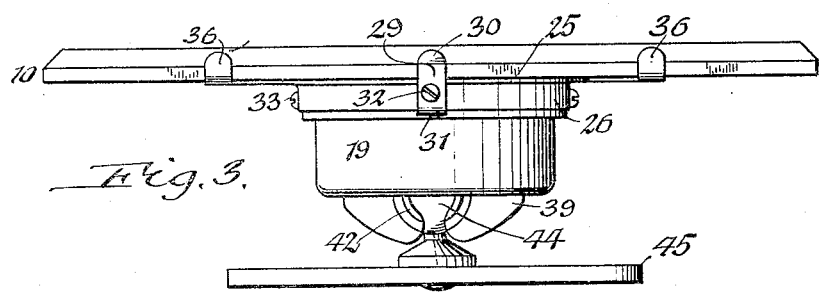
Fig. 3 is a top plan view thereof.

Various means may be employed for mounting the clock and its bezel on the mirror plate and two satisfactory forms for this purpose are shown in the drawings. The form of the means for mounting the clock on the mirror plate, shown in Figs. 1–8, is constructed as follows:

The numeral 19 represents the cylindrical wall of a cup-shaped housing which surrounds the clock casing and is provided with a rear head 20 which bears against the rear side of the clock casing 13 through the medium of an interposed packing disk 21 of felt or similar material. The front end of the housing bears against an annular rearwardly facing shoulder 22 on the bezel and, in rear its front end, the clock housing is provided with an inner annular shoulder 23 which bears against the rear side of an annular bead 24 on the front end of the clock casing 13 whereby this bead is gripped between the bezel 16 and the shoulder 23 on the clock housing and the clock is securely held in place.

Arranged centrally in rear of the mirror plate is an upright plate of sheet metal 9 which forms part of the means for detachably mounting the clock on the mirror plate which clock supporting plate comprises an upper ring shaped portion having an annular vertical flange 25 and a horizontal flange 26 projecting rearwardly from the inner edge of the vertical flange, and a lower part having the form of a bar or arm 27 which projects downwardly from the lower part of the vertical flange 25. The lower end of the arm 27 is provided with a forwardly and upwardly projecting hook 28 which engages with the central part of the lower edge of the mirror plate and the upper part of the ring shaped portion of this clock supporting plate is detachably connected with the central part of the upper edge of the mirror plate by means of a clip 29 having a hook 30 at its front end which engages over the upper edge of the mirror plate and a rear hook 31 which engages with the rear part of the annular upper portion of the clock supporting plate and a screw 32 which detachably connects this clip with the clock supporting plate and bears with its head against the central part of the clip while its threaded shank engages with the threaded opening in the upper part of the flange 26, as best shown in Fig. 5.

The front part of the clock housing is seated within the horizontal flange 26 of the clock supporting plate and is detachably secured thereto by means of screws 33 passing through the flange 26 and engaging with threaded openings in the front end of the peripheral part of the clock housing, as shown in Figs. 4 and 6.

The means for mounting the mirror on the windshield of an automobile or other support and thus indirectly also supporting the clock which is attached to the mirror, are preferably constructed as follows:

The numeral 34 represents an upper mirror mounting plate which is arranged in rear of the lower part of the mirror plate and provided at its opposite ends with two upwardly diverging arms 35 which are arranged on opposite sides of the upper part of the clock mounting so as to virtually embrace the same and which are provided at their upper ends with hooks 36 engaging over the upper edge of the mirror plate on opposite sides of the clock mounting. The numeral 37 represents a lower plate which forms part of the mirror plate mounting and which is arranged in rear of the upper plate 34 and the adjacent part of the mirror plate and provided at opposite ends of its lower edge with hooks or claws 38 engaging with the lower edge of the mirror plate. These two plates 34 and 37 of the mirror mounting are adjustably and detachably connected with each other by means of opposed upper and lower lugs 39 and 40 which project rearwardly respectively from the upper mounting plate 34 and the lower mounting plate 37 and which are detachably connected with each other by means of clamping screws 41. The rear parts of these lugs 39 and 40 are constructed to form parts 42, 43 of a socket which receives a ball 44 on the lower end of a hanger 45 which is attached to the frame of a windshield of an automobile or other available support upon which the same is to be installed.

Both the upper and lower plates 34 and 37 of the mirror mounting are arranged in rear of the arm or bar 27 of the plate forming part of the clock mounting but these mirror mounting plates 34, 37 are provided in rear of the bar or arm 27 with rearwardly offsets or channels 46, 47, respectively, as shown in Fig. 7 whereby these mounting plates of the mirror plate are spaced from the arm or bar 27 and do not engage the same. By this means no physical connection is established between the mounting of the clock and the mounting of the mirror excepting the mirror plate itself, thereby enabling the clock to be assembled with its mounting as a unit and the mirror assembled with its mounting as another unit and permits assembling these two units for producing a complete holder without either of these mountings interfering with the other and also permitting each of these mountings and the respective member carried thereby to be taken apart and reassembled for inspection, adjustment or repairs independently of the other mounting and the parts carried thereby when desired.

The winding and setting of the clock is effected without taking the same off the mirror plate by a stem 8 projecting from the underside of the clock downwardly through an opening 7 in the clock housing and vertically alined openings 5, 6 in the lugs 39, 40 of the mirror plate mounting, which last mentioned openings are large enough to permit the free passage of the stem without dismembering either the clock mounting or the mirror mounting for this purpose.

As an alternative, the mounting for the clock on the mirror plate, shown in Figs. 1-8, may be replaced by that shown in Fig. 9 in which a bezel is provided which is of channel shaped form in cross section so as to provide a front bearing ring or web 48 which engages the rear side of the mirror plate, an inner beveled flange 49 extending inwardly from the front ring 48 to the front side of the clock case and an outer flange 50 which projects rearwardly from the outer edge of the ring 48 and into engagement with the forwardly facing shoulder 51 on the front edge of the clock housing wall 19. Screws 52 secure the front edge of the clock housing wall 19 to this outer flange 50 and bolts 53 secure this bezel to the mirror plate and which pass through corresponding openings in the glass plate and the front ring 48 of the bezel.

The bezel consisting of the parts 48, 49 and 50 is preferably provided on its front side with an annular rib 54 which engages with an annular groove 55 in the rear side of the mirror plate. This bezel is also preferably made of cast metal in a die and in order to make the same strong and durable and still not too heavy the outer flanges 50 of the same is made comparatively narrow throughout the major part of its circumference but those parts thereof which receive the screws 52 are thickened or widened as shown at 56 and thereby provide the necessary stock in which screw threaded openings of the required length can be formed for the reception of the screws 52. The opening 57 in each widened portion 56 of this bezel is placed as close as possible to the front ring or web 48 of the bezel and in order to avoid engaging the tap which threads the opening 57 in this widened portion 56 the rear side of the ring or web 48 is provided with a recess 58 immediately in front of the opening 56 and thereby insures the necessary clearance so that the screw threading tap will not engage any material on the bezel at this point and thus guard against deflecting the tap as well as avoiding unnecessary work.

Inasmuch as each of the holes 59 in the ring or web 48 of the bezel which receive a bolt 53 must be arranged close to the outer rearwardly projecting flange 50, those parts of the outer flange 50 adjacent to each of the bolt holes 59 is removed so as to leave a notch or recess 60 adjacent to the outer side of each of these holes, as shown in Figs. 9 and 10. This permits of producing good die castings of this bezel without making the same unduly thin next to the holes 59, inasmuch as a thin section in this flange would be difficult to cast and also would be liable to break away.

In both of these constructions the means for mounting the clock on the rear side of the mirror plate and the means for mounting the mirror plate on a support are so organized that they are symmetrical and permit of balancing the appearance of the mirror and the clock when viewed from the front side thereof and at the same time permit of adjusting, repairing or inspecting the parts of the mirror mounting and the clock mounting without one interfering with the other.

I claim as my invention:

1. A bracket for supporting a transparent panel and an instrument, comprising upper and lower plates arranged in overlapping relation on the rear side of the panel and adjustably connected with each other and having rearwardly offset parts, said lower plate having means engaging the lower edge of the panel and said upper plate having arms provided with means engaging the upper edge of the panel, and means for mounting said clock on the rear side of the panel including an upright plate having an upper part arranged between said arms and provided with means for engaging the upper edge of the panel and a lower part arranged with said offset parts and provided with means for engaging with the lower edge of the panel.

2. A bracket for supporting a transparent panel and an instrument having an outwardly projecting stem, comprising a mounting adapted to be secured to the rear part of the panel, and a mounting for securing the instrument to said panel independently of said panel mounting, said panel mounting being provided with openings for the passage of said stem.

3. A mounting for securing an instrument to a transparent panel comprising an annular bezel of channel shape in cross section having a web engaging the rear side of said panel, an inner rearwardly projecting flange engaging the front of said instrument, an outer rearwardly projecting flange, and a housing for said instrument secured to said outer flange and fastening bolts extending through said panel and securing the web of said bezel to said panel.

4. A mounting for securing an instrument to a transparent panel comprising an annular bezel of channel shape in cross section having a web engaging the rear side of said panel, an inner flange engaging the front of said instrument and an outer flange provided with notches, bolts passing through said web and panel adjacent to said notches, and a housing for said instrument secured to said outer flange.

5. A mounting for securing an instrument to a transparent panel comprising an annular bezel of channel shape in cross section having a web engaging the rear side of said panel, an inner flange engaging the front of said instrument and an outer flange, said outer flange being provided with thickened portions having radial screw threaded openings and said web having recesses on its rear side adjacent to said openings, a housing surrounding said instrument and bezel, and screws passing through said housing and engaging said threaded openings on the bezel.

In testimony whereof I hereby affix my signature.

WILLIAM LA HODNY.